(12) United States Patent
Oka

(10) Patent No.: US 9,866,009 B2
(45) Date of Patent: Jan. 9, 2018

(54) PROTECTION CIRCUIT

(71) Applicant: Onkyo & Pioneer Technology Corporation, Osaka (JP)

(72) Inventor: Takuya Oka, Osaka (JP)

(73) Assignee: ONKYO & PIONEER TECHNOLOGY CORPORATION, Osaka (JP)

( * ) Notice: Subject to any disclaimer, the term of this patent is extended or adjusted under 35 U.S.C. 154(b) by 308 days.

(21) Appl. No.: 14/821,022

(22) Filed: Aug. 7, 2015

(65) Prior Publication Data
US 2016/0064919 A1  Mar. 3, 2016

(30) Foreign Application Priority Data

Aug. 28, 2014  (JP) .................................. 2014-173467

(51) Int. Cl.
| | |
|---|---|
| H02H 3/20 | (2006.01) |
| H02H 9/04 | (2006.01) |
| H02H 3/08 | (2006.01) |
| H02H 3/087 | (2006.01) |
| H02H 9/02 | (2006.01) |
| H02H 9/00 | (2006.01) |

(Continued)

(52) U.S. Cl.
CPC ............ *H02H 3/087* (2013.01); *H02H 3/207* (2013.01); *H02H 9/001* (2013.01); *H02H 11/006* (2013.01); *H02M 3/155* (2013.01)

(58) Field of Classification Search
CPC .......... H02H 3/087; H02H 3/207; H02H 3/20; H02H 9/04; H02H 9/041; H02H 3/08; H02H 3/10

USPC ........................................................ 361/91.1
See application file for complete search history.

(56) References Cited

U.S. PATENT DOCUMENTS

| | | | | |
|---|---|---|---|---|
| 4,073,003 A | * | 2/1978 | Chambers .............. | G09G 1/005 307/17 |
| 8,537,517 B1 | | 9/2013 | Banak et al. | |

(Continued)

FOREIGN PATENT DOCUMENTS

| | | |
|---|---|---|
| JP | 48-006259 A | 1/1973 |
| JP | 09-074666 A | 3/1997 |

(Continued)

*Primary Examiner* — Dharti Patel
(74) *Attorney, Agent, or Firm* — Renner, Otto, Boisselle & Sklar, LLP

(57) ABSTRACT

There is provided a protection circuit that is mounted between an AC adapter and a load circuit, operates with power supplied from the AC adapter, has a soft start function, and can perform overvoltage protection and the like. An audio device 10 is configured to include a protection circuit 20 at the side of the AC adapter 8, as well as a load circuit 12 that is an audio circuit body and a speaker. The protection circuit 20 includes an input terminal 22 connected to the AC adapter 8, an output terminal 24 connected to the load circuit 12, a power supply line 25 extending toward the output terminal 24 from the input terminal 22, a switch unit 26 and a DC/DC converter 28, the switch unit 26 and the DC/DC converter 28 being provided along the power supply line 25, and a protection circuit unit 30 that detects a voltage state or a current state on the power supply line 25 and protects the DC/DC converter 28 and the load circuit 12.

2 Claims, 2 Drawing Sheets

(51) Int. Cl.
 *H02H 11/00* (2006.01)
 *H02M 3/155* (2006.01)

(56) References Cited

U.S. PATENT DOCUMENTS

2002/0118823 A1* 8/2002 Tomobe .............. H04M 19/008
 379/413
2003/0205995 A1* 11/2003 Odaohhara ............. G06F 1/263
 324/103 R
2012/0219829 A1* 8/2012 Shimura ............. H01M 14/005
 429/7

FOREIGN PATENT DOCUMENTS

| JP | 09-284994 A | 10/1997 |
| JP | 11-018280 A | 1/1999 |
| JP | 2002-084742 A | 3/2002 |
| JP | 2010-220277 A | 9/2010 |
| JP | 2012-143110 A | 7/2012 |

* cited by examiner

PROTECTION CIRCUIT

BACKGROUND OF THE INVENTION

1. Field of the Invention

The present invention relates to a protection circuit, and more particularly to a protection circuit which protects a load circuit operating with power supplied from an AC adapter and which has a soft start function.

2. Description of the Related Art

A consumer product operating with a DC power source often receives DC power supply from a commercial power source through an AC adapter. When an AC adapter other than a designated AC adapter is connected for DC power supply, predetermined DC power is not supplied to cause overvoltage, overcurrent, or low voltage, which disables a normal operation of the consumer product. In some cases, the consumer product might be damaged.

For example, JP-A-11-18280 describes an overvoltage detection circuit in an electronic device to which a power source is supplied with an AC adapter, the overvoltage detection circuit using a zener diode, a resistor, and a transistor to prevent a supply of overvoltage due to a difference in specification of AC adapters.

Some consumer products have a protection circuit having a soft start (or soft switch) function, as well as an overvoltage protection circuit. According to the soft start function, a consumer product can receive a power supply after a predetermined delay time from a point at which an AC adapter is inserted, whereby a sharp voltage change upon the insertion of the AC adapter can be eased.

For example, JP-A-2010-220277 describes, as an abnormal voltage protection circuit, a configuration including a power supply detection circuit having a zener diode that is turned on when power with a supply voltage of 15 V or higher is supplied from an input terminal to which an AC adapter is connected; an overvoltage detection circuit having a zener diode that is turned on when power with a supply voltage of 18 V or higher is supplied; and a microcomputer controlling a power supply to an electronic circuit connected to an output terminal based on the detection results of these two detection circuits.

In this configuration, the microcomputer is operated with an internal power source such as a button battery. When the power supply detection circuit detects a voltage of less than 15 V, the microcomputer controls not to supply power to the output terminal, and when the power supply detection circuit detects a voltage of 15 V or higher, the microcomputer controls to start an action of a counter for a soft start. After the counter indicates a lapse of a predetermined time, the microcomputer controls to start a power supply to the output terminal, but when the overvoltage detection circuit detects a voltage of 18 V or higher during the power supply, the microcomputer resets the counter. Specifically, this publication describes that, when power with a supply voltage within a range of 15 V to 18 V is supplied from the input terminal, power is supplied to the output terminal after a lapse of a predetermined time from the power supply detection.

Some consumer products have incorporated therein a DC/DC converter for adjusting a voltage value of DC power supplied from an AC adapter to an optimum voltage value. A DC/DC converter temporarily receives power supplied form an AC converter, adjusts a voltage value of the power to an optimum value, and then, supplies the resultant power to a load circuit. Thus, a supply of overvoltage or the like can be prevented.

JP-A-09-284994 points out that, when a DC-DC converter, which is provided between an AC adapter and a load circuit and has a function as an overvoltage protection circuit to the load circuit, is broken down, the DC-DC converter loses the function as the overvoltage protection circuit, and therefore, overvoltage is likely to be supplied to the load circuit. In view of this, a fuse is provided after the AC adapter, and an FET is connected in series between the fuse and the DC-DC converter to apply a voltage at a load-side terminal of the DC-DC converter to a gate of the FET. When the voltage at the load-side terminal becomes an overvoltage due to breakdown of the DC-DC converter, the FET is shut off to prevent a supply of overvoltage to the load.

In a consumer product having a soft start function, an internal circuit is not operated until an AC adapter is connected. Therefore, one of the problems is at which timing the soft start function and an overvoltage detection function and the like are performed. JP-A-2010-220277 aims to solve this problem by the microprocessor having a button battery. However, this technique cannot be applied to a consumer product not having a button battery incorporated therein.

SUMMARY OF THE INVENTION

An object of the present invention is to provide a protection circuit which operates with power supplied from an AC adapter, has a soft start function, and also performs an overvoltage protection.

The present invention provides a protection circuit which protects a load circuit operating with power supplied from an AC adapter, the protection circuit including a power supply line extending from an input terminal connected to the AC adapter to an output terminal connected to the load circuit via a DC/DC converter; a switch unit provided between the input terminal and the DC/DC converter; and a protection circuit unit that stops the operation of the DC/DC converter to protect the load circuit, when an overvoltage or an overcurrent is detected, wherein the protection circuit unit includes: an overvoltage detection element that is turned on when a supplied voltage to the input terminal exceeds a predetermined overvoltage threshold value; an overcurrent detection element that is turned on when a current flowing through the power supply line exceeds a predetermined overcurrent threshold value; and a control signal output unit having an abnormal detection resistor element connected in series between a ground potential and a connection point where the overvoltage detection element and the overcurrent detection element are connected to each other in parallel, and an abnormal detection transistor that is turned on/off at a terminal voltage of the abnormal detection resistor element, the control signal output unit outputting a control signal for enabling the DC/DC converter to operate when the abnormal detection transistor is off and for stopping the operation of the DC/DC converter when the abnormal detection transistor is on.

Preferably in the protection circuit according to the present invention, the switch unit includes a switching element connected in series between the input terminal and the DC/DC converter, a current limiting resistor element which is connected in parallel to the switching element and has a resistance value larger than on-resistance of the switching element, and a switch control element that turns on the switching element when a current flows through the current limiting resistor element, wherein a timing at which the switching element is turned on is delayed from a point at which a supply of power is started from the AC adapter, according to a delay time of currents flowing through the current limiting resistor element and the switch control element.

Preferably in the protection circuit according to the present invention, the protection circuit unit includes a low-voltage protection unit that generates an enable signal in which a voltage level of the control signal is reduced with a predetermined voltage dividing ratio by a level conversion element provided between an output terminal of the abnormal detection transistor and the ground potential, the low-voltage protection unit controlling to set a voltage level of the enable signal to a voltage less than an operating threshold voltage of the DC/DC converter when the supplied voltage from the input terminal is less than a predetermined low voltage threshold value, in order to stop the operation of the DC/DC converter even if the abnormal detection transistor is off.

Preferably in the protection circuit according to the present invention, the protection circuit unit includes a rated voltage protection unit that is provided between an output-side terminal of the current limiting resistor element and the ground potential and that is turned on when a voltage at the output-side terminal of the current limiting resistor element exceeds a maximum rated voltage set beforehand to prevent a supply of a voltage exceeding the maximum rated voltage to the DC/DC converter.

According to the above configuration, the protection circuit includes the switch unit and the protection circuit unit that stops the operation of the DC/DC converter to protect the load circuit, when an overvoltage or an overcurrent is detected. The protection circuit unit outputs a control signal for stopping the operation of the DC/DC converter by the abnormal detection transistor that is turned on/off at a terminal voltage of the abnormal detection resistor element connected in series between the ground potential and the connection point where the overvoltage detection element and the overcurrent detection element are connected to each other in parallel. As described above, the protection circuit can operate with power supplied from the AC adapter, has a soft start function, and can perform an overvoltage protection.

In the protection circuit unit, the overvoltage detection element and the overcurrent detection element are connected to each other in parallel. Therefore, the operation of the DC/DC converter can be stopped to protect the load circuit by only one abnormal detection transistor, in either case of overvoltage and overcurrent.

In addition, the switch unit in the protection circuit determines the delay time for determining the timing at which the switching element is turned on based on the delay times of currents flowing through the current limiting resistor element and the switch control element, the switching element being connected to the power supply line in series for a soft start. The protection circuit can operate the switch unit with power supplied from the AC adapter without using a microprocessor operating with a button battery as described in JP-A-2010-220277.

The protection circuit also generates an enable signal in which a voltage level of the control signal is reduced with a predetermined voltage dividing ratio. Therefore, even if the abnormal detection transistor is off, and power is supplied through the switch unit, but the voltage is low to be less than a predetermined voltage range, the operation of the DC/DC converter can be stopped. This can prevent malfunction of the load circuit caused by excessively low supplied voltage.

In the protection circuit, even if the operation of the DC/DC converter is stopped to protect the load circuit due to the detection of overvoltage by the overvoltage detection element, the overvoltage might be inputted to the DC/DC converter via the current limiting resistor, resulting in that the DC/DC converter might be damaged due to the overvoltage applied to the DC/DC converter. In view of this, in the above configuration, the rated voltage protection unit, which is turned on when the supplied voltage exceeds the maximum rated voltage set beforehand, is provided between the output-side terminal of the current limiting resistor element and the ground potential. This configuration can prevent the DC/DC converter from being damaged.

DETAILED DESCRIPTION OF PREFERRED EMBODIMENT

Figure 1:
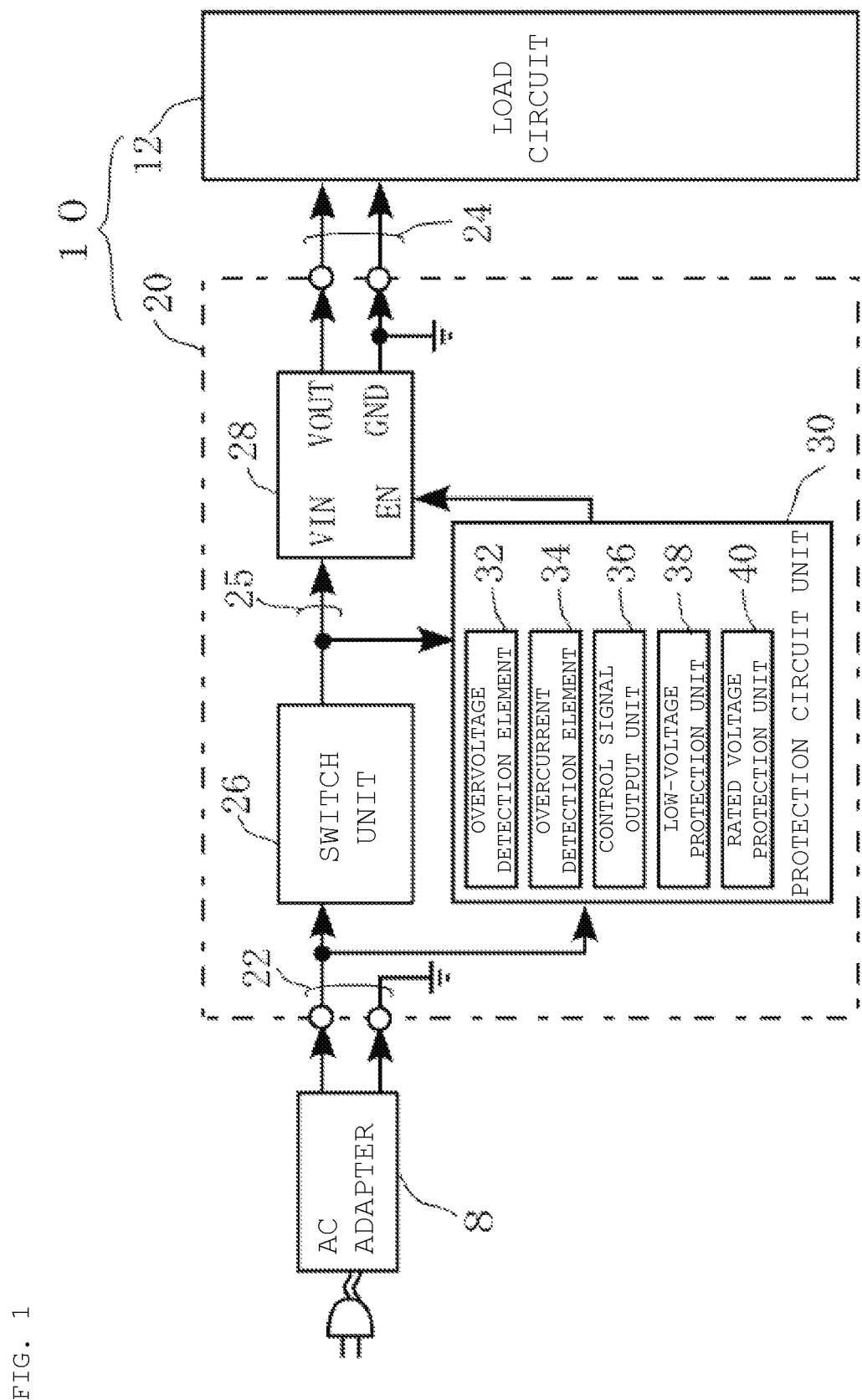
FIG. 1 is a diagram illustrating a configuration of an audio device including a protection circuit with a soft start function according to an embodiment of the present invention.

Hereinafter, a preferred embodiment of the present invention will be described in detail with reference to the drawings. While an audio device will be described below as a consumer product including a protection circuit, it is only illustrative for description, and any electronic device operating with power supplied from an AC adapter, such as a consumer product, may be employed. Circuit constants, voltage values, current values, power values, numerical quantities, and the like mentioned below are illustrative for description, and they can be appropriately changed according to a specification of a protection circuit. In the description below, a bipolar transistor and a MOSFET (Metal Oxide Silicon Field Effect Transistor) are separately used as a switching element or a transistor. However, a bipolar transistor may be replaced with an equivalent MOSFET, or a MOSFET may be replaced with an equivalent bipolar transistor. In the description below, similar components are identified by the same reference numerals in all drawings, and the redundant description will not be repeated.

FIG. 1 is a diagram illustrating a configuration of an audio device 10 including a protection circuit. FIG. 1 also illustrates an AC adapter 8 connected to the audio device 10, although the AC adapter 8 is not a constituent element of the audio device 10. The audio device 10 is audio equipment that operates with DC power supplied from the AC adapter 8 without having inside a DC power source such as a secondary battery or a dry-cell battery.

The AC adapter 8 is an AC/DC converter that converts AC power with, for example, AC 100 V from a commercial power source into DC power having a predetermined voltage value. The AC adapter 8 is manufactured according to a specification in which an input voltage range determined according to the specification of the audio device 10 is specified as an output voltage range and an input current range of the audio device 10 is specified as an output current range. The AC adapter 8 is commonly sold as an accessory of the audio device 10. As one example of the specification of the AC adapter 8, the AC adapter 8 uses, as an input power source, a commercial AC power source with a frequency of 50 Hz or 60 Hz within a range of AC 100 V to 240 V, and outputs DC power with a nominal output voltage value of 25 V and nominal output current value of 200 mA.

The audio device 10 is configured to include a protection circuit 20 at the side of the AC adapter 8, as well as a load circuit 12 that is an audio circuit body and a speaker. The protection circuit 20 is a protection circuit for preventing a supply of overvoltage, overcurrent, low voltage, or overpower, which is outside the specification of the audio device 10, to the load circuit 12, when power is supplied from an AC adapter having a specification different from the specification of the AC adapter 8 designated as an accessory of the audio device 10.

The protection circuit 20 includes an input terminal 22 connected to the AC adapter, an output terminal 24 connected to the load circuit 12, a power supply line 25 extending toward the output terminal 24 from the input terminal 22, a switch unit 26, and a DC/DC converter 28, the switch unit 26 and the DC/DC converter 28 being connected along the power supply line 25 in order from the input terminal 22 to the output terminal 24. The protection circuit 20 also includes a protection circuit unit 30 that detects a voltage state or a current state on the power supply line 25 to prevent a value of a voltage supplied to the DC/DC converter 28 from exceeding an overvoltage or a maximum rated voltage, or to prevent a value of a current flowing through the power supply line 25 from becoming an overcurrent.

The input terminal 22 includes two terminals connected to two output terminals of the AC adapter 8. One of the two terminals is connected to a ground potential, and the other is connected to an input-side terminal of the power supply line 25. The power supply line 25 is a power line for transmitting power in the protection circuit 20. The output terminal 24 includes two terminals, one of which is connected to the ground potential, and the other one of which is connected to an output-side terminal of the power supply line 25. The input terminal 22 of the protection circuit 20 is provided on a housing of the audio device 10 to be exposed to the outside. The protection circuit 20 and the load circuit 12 are connected to each other in the audio device 10. Therefore, the output terminal 24 of the protection circuit 20 is located inside the housing of the audio device 10, so that it is not visually recognized from the outside.

Figure 2:
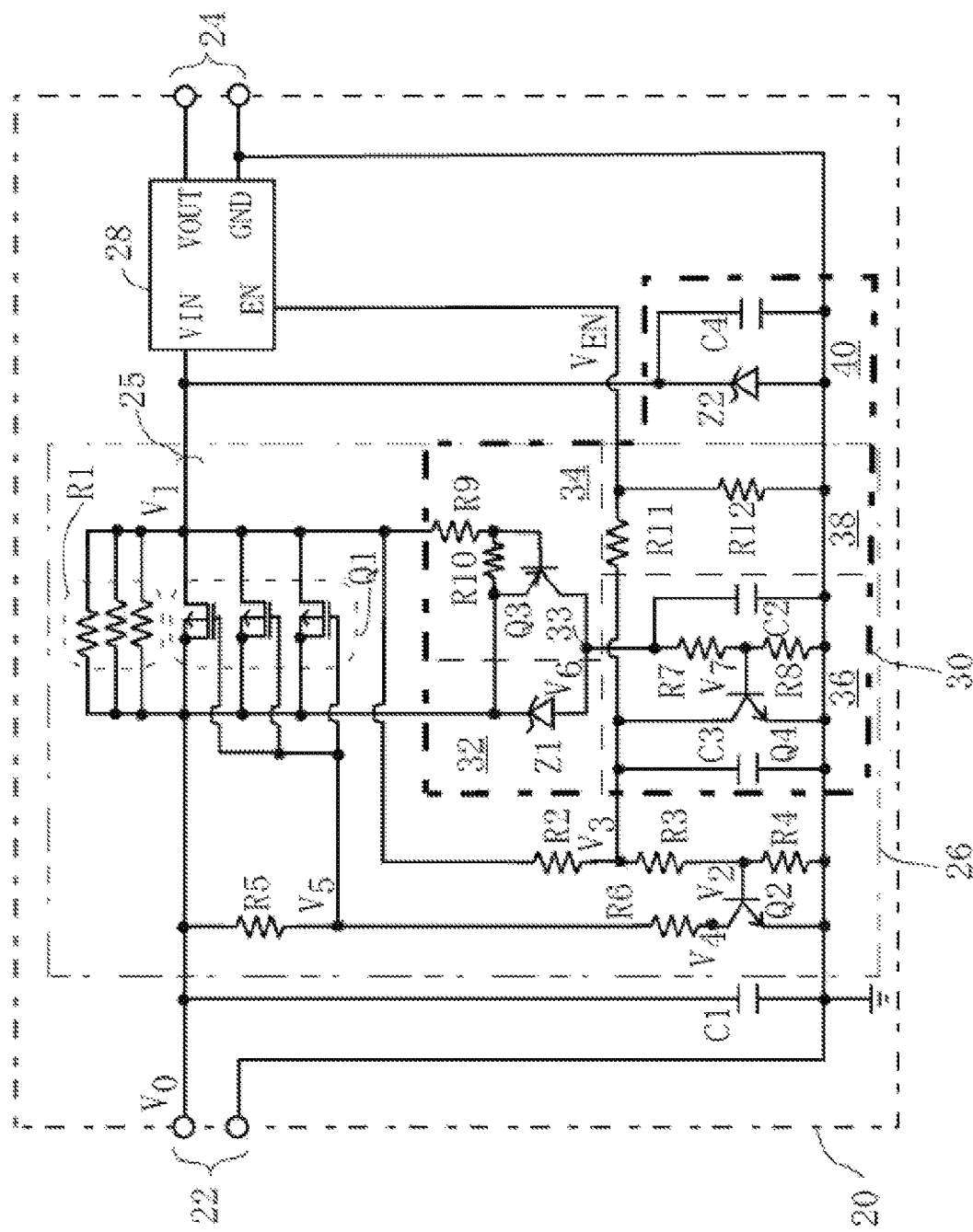
FIG. 2 is a detailed circuit diagram of the protection circuit shown in FIG. 1.

The switch unit 26, the DC/DC converter 28, and the protection circuit unit 30 are provided between the input terminal 22 and the output terminal 24. The protection circuit unit 30 is configured to include an overvoltage detection element 32, an overcurrent detection element 34, a control signal output unit 36 that outputs a control signal to the switch unit 26 and the DC/DC converter 28 according to an overvoltage detection or overcurrent detection, a low-voltage protection unit 38, and a rated voltage protection unit 40. FIG. 2 is a detailed circuit diagram of the protection circuit 20.

In FIG. 2, C1 is a capacitor provided between the power supply line 25 at the side of the input terminal 22 and the ground potential for smoothing a voltage and a current supplied to the power supply line 25 from the AC adapter 8 via the input terminal 22.

The switch unit 26 is a power supply delay circuit that supplies DC power, which is supplied from the AC adapter 8, to the DC/DC converter 28 with a predetermined delay time from a point at which the AC adapter 8 is connected to the input terminal 22 to start the supply of the DC power.

The switch unit 26 includes a switching element Q1 connected to the power supply line 25 in series, a current limiting resistor element R1 connected to the switching element Q1 in parallel, a switch control element Q2 that turns on the switching element Q1 when a current flows through the current limiting resistor element R1, three resistor elements R2, R3, and R4 that determine a voltage value of a control terminal of the switch control element Q2, and two resistor elements R5 and R6 that determine a voltage value inputted to a control terminal of the switching element Q1 from an output terminal of the switch control element Q2.

In the description below, a resistor element RX is a term for distinguishing the resistor elements, and also indicates that a resistance value of the corresponding resistor element is RX. For example, the resistor element R2 means that it is the second resistor element in the description, and its resistance value is R2 Ω.

When turned on, the switching element Q1 short-circuits the power supply line 25 to bring the power supply line 25 into a power transmission mode for transmitting power supplied from the side of the input terminal 22 to the side of the DC/DC converter 28. When turned off, the switching element Q1 opens and shuts off the power supply line 25 to bring the power supply line 25 into a shut-off mode for preventing power supplied from the side of the input terminal 22 from being transmitted to the side of the DC/DC converter 28. In this way, the switching element Q1 is a switching unit to switch between transmission and shut-off of power on the power supply line 25.

The switching element Q1 is a p-channel MOSFET. A source terminal of the switching element Q1 is connected to the power supply line 25 at the side of the input terminal 22, a drain terminal thereof is connected to the power supply line 25 at the side of the DC/DC converter 28, and a gate terminal thereof is connected to the connection point between R5 and R6. In FIG. 2, three switching elements Q1 are connected in parallel. The number of the switching elements Q1 connected in parallel is set to satisfy a value of a current flowing when the power supply line 25 is short-circuited to be brought into the power transmission mode. Depending on the specification of the audio device 10, one switching element Q1 connected in parallel may sometimes be sufficient, or four or more switching elements Q1 connected in parallel may sometimes be required.

The current limiting resistor element R1 is a resistor element connected to the switching element Q1 in parallel, and has a function as a power supply detection unit detecting that power is supplied to the input terminal 22. Specifically, when the terminal of the current limiting resistor element R1 at the side of the DC/DC converter 28 is defined as an output-side terminal, the output-side terminal is connected to the ground potential via R2, R3, and R4. Therefore, when a current does not flow through the current limiting resistor element R1, the voltage value V1 at the output-side terminal is equal to the ground potential which is equal to 0 V. At the timing at which the power is supplied to the input terminal 22, the switching element Q1 is in an off state. Therefore, power supplied to the input terminal 22 flows through the ground potential via the current limiting resistor element R1 and the resistor elements R2, R3, and R4. Thus, the voltage value V1 at the output-side terminal of the current limiting resistor element R1 rises to $V1=V0\times\{R1/(R1+R2+R2)\}$ with the voltage value of the power supplied to the input terminal 22 being defined as V0. The current limiting resistor element R1 can detect a start of the power supply based on the rise in the voltage value V1 at the output-side terminal of the current limiting resistor element R1.

The upper limit of the resistance value R1 of the current limiting resistor element R1 is determined by a resistance value by which a minimum necessary current as the power supply detection unit can be flown, and the lower limit of the resistance value R1 is determined such that the power flowing through the power supply line 25 does not exceed the maximum rated value when the switching element Q1 is off. The resistance value of the current limiting resistor element R1 is sufficiently higher than the on-resistance value of the switching element Q1. For example, the resistance value of the current limiting resistor element R1 can be set to 0.3 kΩ. In FIG. 2, three current limiting resistor elements R1 are connected in parallel. The number of R1 connected in parallel is determined according to the specification of the rated power value of one resistor element R1. According to circumstances, one resistor element R1 connected in parallel may sometimes be sufficient, or four or more resistor elements R1 connected in parallel may sometimes be required.

The switch control element Q2 is a transistor that turns on the switching element Q1 when a current flows through the current limiting resistor element R1. The switch control element Q2 is an n-channel bipolar transistor. An emitter terminal of the switch control element Q2 is connected to the ground potential, a collector terminal thereof is connected to the power supply line 25 at the side of the input terminal 22 via the resistor elements R6 and R5, and a base terminal thereof is connected to a connection point between R3 and R4.

The resistance value of each of the resistor elements R1, R2, R3, and R4 is set to convert the voltage value V1 at the output-side terminal at the point at which a current flows through the current limiting resistor element R1 into a voltage value V2 by which the switch control element Q2 is turned on. The voltage value V2 by which the switch control element Q2 is turned on is caused when the voltage value V2 at the base terminal of the switch control element Q2 becomes a threshold voltage. For example, when the threshold voltage of Q2 is defined as 0.6 V, R4 can appropriately be determined to satisfy $V2=V1\times\{R4/(R1+R2+R3+R4)\}=0.6$ V. Since the voltage value V3 at the connection point between R2 and R3 is a voltage value of a later-described control signal, a voltage dividing ratio of (R1+R2) and (R3+R4) can be determined by the setting of the voltage value of the control signal. The setting of R1 has already been described.

The resistance value of each of the resistor elements R5 and R6 is set to convert a collector-terminal voltage value V4, which is an output voltage value when the switch control element Q2 is turned on, into a voltage value V5 by which the switching element Q1 is turned on. The voltage value V5 by which the switching element Q1 is turned on is caused when the voltage value V5 at the gate terminal of the switching element Q1 becomes a threshold voltage. When the threshold voltage of Q1 is defined as a voltage lower than the voltage value V0 at the input terminal 22 by 1.0 V, the voltage dividing ratio of R5 and R6 can appropriately be determined to satisfy $V5=V0\times\{R5/(R5+R6+\text{on-resistance of }Q2)\}=1.0$ V. Alternatively, when an on current of Q2 is defined as 145, the value of R5 can be determined from $V5=145\times R5=1.0$ V.

The operation of the switch unit 26 is as stated below. In the state in which the AC adapter 8 is not connected to the audio device 10, the output-side terminal of the current limiting resistor element R1 is connected to the ground potential via R2, R3, and R4, and the input terminal 22 is connected to the ground potential via R1, R2, R3, and R4, whereby V1=V2=0 V. Accordingly, Q2 is in an off state, and Q1 is also in an off state. When the timing at which the AC adapter 8 is connected to the audio device 10 is defined as t0, the voltage value of the input terminal 22 becomes the voltage value V0 of power supplied from the AC adapter 8 at the present, while the voltage value V1 is still 0 V because Q2 is still in the off state. Therefore, a current flows through the current limiting resistor element R1 by the voltage difference between V0 and 0 V, whereby the voltage value V1 at the output-side terminal of the current limiting resistor element R1 increases from 0 V. With this, V2 increases to the threshold voltage of Q2, whereby Q2 is turned on. After Q2 is turned on, V4 decreases, whereby V5 decreases to the threshold voltage of Q1, so that Q1 is turned on. Thus, the power supply line 25 becomes the power transmission mode from the shut-off mode, and therefore, power supplied to the input terminal 22 is supplied to the DC/DC converter 28.

The timing t1 at which Q2 is turned on is delayed from the timing t0 at which power is supplied to the input terminal 22 from the AC adapter 8 by the total delay time which is obtained by adding up a delay time required to allow power supplied from the input terminal 22 to flow through the current limiting resistor element R1 to increase the voltage value V1 at the output-side terminal of the current limiting resistor element R1, a delay time required to allow current to flow through R2, R3, and R4 due to the voltage difference between the voltage value V1 and the ground potential to increase the voltage value V2 at the connection point between R3 and R4 to the threshold voltage of the Q2, a delay time required to turn on Q2 by the voltage value V2 to decrease the output voltage of Q2 to V4, a delay time required to decrease the voltage value V5 at the connection point between R5 and R6 to the threshold voltage of Q1 due to the decrease in V4, and a delay time required until Q1 is turned on by the voltage value V5. In this way, power is supplied to the DC/DC converter 28 with the delay of $\Delta t = t1-t0$ from the timing t0 at which the power supply is started by the AC adapter 8. The delay time is set for the power supply as described above, whereby the DC/DC converter 28 can safely be protected from an impact of a sharp change in a voltage value or a current value upon the connection of the AC adapter 8.

Next, the detail of the protection circuit unit 30 will be described. The protection circuit unit 30 includes five blocks which are the overvoltage detection element 32, the overcurrent detection element 34, the control signal output unit 36, the low-voltage protection unit 38, and the rated voltage protection unit 40.

The overvoltage detection element 32 is a zener diode Z1 having one terminal connected to the power supply line 25 at the side of the input terminal 22 and the other terminal connected to the ground potential via R7 and R8. The overvoltage detection element 32 is turned on when the voltage difference between both terminals exceeds a predetermined overvoltage threshold value. For example, the predetermined overvoltage threshold value is about 27 V.

The operation of the overvoltage detection element 32 is as stated below. In the state in which the AC adapter 8 is not connected to the audio device 10, the other terminal of the overvoltage detection element 32 is connected to the ground potential via R7 and R8, and the one terminal of the overvoltage detection element 32 is also connected to the ground potential via R1, R2, R3, and R4. Therefore, the voltage difference between both terminals of the overvoltage detection element 32 is 0 V, so that the overvoltage detection element 32 is in an off state.

At the timing t0 at which the AC adapter 8 is connected to the audio device 10, the voltage value V0 of the input terminal 22 is applied to the one terminal of the overvoltage detection element 32. When the voltage value V0 is less than the overvoltage threshold value that is 27 V, the overvoltage detection element 32 keeps turned off. When the voltage value V0 exceeds 27 V that is the overvoltage threshold value, the overvoltage detection element 32 is turned on, and the voltage value V6 at the other terminal of the overvoltage detection element 32 increases to a value around V0. The overvoltage detection element 32 can detect that the voltage value of power supplied from the AC adapter 8 is an overvoltage based on the increase in the voltage value V6 at the timing t0 at which the AC adapter 8 is connected to the audio device 10.

The overcurrent detection element 34 is a composite element including two resistor elements R9 and R10 and one transistor Q3. The transistor Q3 is a p-channel bipolar transistor. An emitter terminal of the transistor Q3 is connected to the one terminal of the overvoltage detection element 32, a collector terminal thereof is connected to the other terminal of the overvoltage detection element 32 at a connection point 33, and a base terminal thereof is connected to the output-side terminal of the current limiting resistor element R1 via R9. The base terminal and the emitter terminal are connected via R10.

Considering this connection relation for the switching element Q1, the output-side terminal of the current limiting resistor element R1 is a drain terminal of Q1, and the one terminal of the overvoltage detection element 32 is a source terminal of Q1. Therefore, the base terminal of the transistor Q3 is connected to the drain terminal of Q1 via R9, and the emitter terminal of the transistor Q3 is connected to the source terminal of Q1. Accordingly, the voltage value between the base and the emitter of the transistor Q3 becomes the voltage value between the drain and the source of Q1.

The operation of the overcurrent detection element 34 is as stated below. In the state in which the AC adapter 8 is not connected to the audio device 10, V0=V1=0 V. Therefore, the voltage value between the drain and the source of Q1 is 0 V, whereby Q3 is in an off state. When the AC adapter 8 is connected to the audio device 10, Q1 is turned on by the function of the switch unit 26, whereby a current flows through the power supply line 25 through Q1. The current flowing through Q1 is the current between the drain and the source, so that the voltage value between the drain and the source of Q1 increases with the increase in the value of this current. With the increase in the voltage value between the drain and the source of Q1, the voltage value between the base and the emitter of the transistor Q3 composing the overcurrent detection element 34 increases. The value of the current flowing through the power supply line 25 is considered as the value of the current flowing through Q1, and the values of R9 and R10 are set such that, when this current value becomes a predetermined threshold current value, the transistor Q3 is turned on. With this setting, the transistor Q3 can be turned on when the value of the current flowing through the power supply line 25 exceeds the threshold current value.

When the transistor Q3 is in an off state, the collector terminal of the transistor Q3 is connected to the other terminal of the overvoltage detection element 32 at the connection point 33, and the connection point 33 is connected to the ground potential via R7 and R8. Therefore, the voltage value V6 at the connection point 33 is 0 V. When the transistor Q3 is turned on, the voltage value V6 at the collector terminal of the transistor Q3 increases with the value of the on-current of the transistor Q3. Accordingly, the overcurrent detection element 34 can detect that the value of the current flowing through the power supply line 25 is overcurrent based on the increase in the voltage value V6 at the timing t1 at which the soft start function is activated.

The voltage value V5 of the collector terminal of the transistor Q3 upon the detection of the value of the current flowing through the power supply line 25 being an overcurrent can be determined by a value of a current flowing between the collector and the emitter when the transistor Q3 is turned on. The value of the current flowing between the collector and the emitter when the transistor Q3 is turned on can be set based on the values of R9 andR10. Therefore, the appropriate setting of R9 and R10 can cause the voltage value V5 at the other terminal of the overvoltage detection element 32 at the point at which the overvoltage detection element 32 detects an overvoltage to be the same as the voltage value V5 at the collector terminal of the transistor Q3 at the point at which the overcurrent detection element 34 detects an overcurrent.

The control signal output unit 36 outputs a control signal to the switch unit 26 and the DC/DC converter 28 according to the overvoltage detection or the overcurrent detection. In FIG. 2, a voltage value of the control signal is indicated by V3.

The control signal output unit 36 includes two resistor elements R7 and R8, one transistor Q4, and two capacitors C2 and C3. The two resistor elements R7 and R8 are connected to each other in series. One terminal of R7 is connected to the connection point 33 between the other terminal of the overvoltage detection element 32 and the collector terminal of the transistor Q3 composing the overcurrent detection element 34, and the other terminal of R8 is connected to the ground potential. The other terminal of R7 and one terminal of R8 are connected to each other.

The transistor Q4 is an n-channel bipolar transistor. An emitter terminal of the transistor Q4 is connected to the ground potential, and a base terminal thereof is connected to a connection point between the other terminal of R7 and the one terminal of R8. The collector terminal is a terminal outputting a control signal. It is connected to an enable terminal EN of the DC/DC converter 28 through the resistor element R11 composing the low-voltage protection unit 38, and also connected to the connection point between the resistor elements R2 and R3 in the switch unit 26.

The capacitor C2 is a capacitor connected in parallel to the resistor elements R7 and R8, which are connected in series, to smooth the voltage value V6 at the connection point 33. The capacitor C3 is a capacitor connected in parallel between the collector terminal and the emitter terminal of the transistor Q4 to smooth the control voltage value V3.

The operation of the control signal output unit 36 is as stated below. The case in which the voltage value of power supplied from the AC adapter 8 is not more than the overvoltage threshold value and the value of the current flowing through the power supply line 25 is not more than the overcurrent threshold value is a normal state. Therefore, the voltage value V2 at the gate terminal of the switch control element Q2 in the switch unit 26 becomes equal to or higher than the threshold voltage of Q2, so that Q2 is turned on, and the switching element Q1 is turned on after a lapse of a predetermined delay time. With this, the power supply line 25 is brought into a power transmission mode, whereby the power supplied from the AC adapter 8 is supplied to an input voltage terminal VIN of the DC/DC converter 28. In this case, the transistor Q4 in the control signal output unit 36 is in an off state, and the voltage value V3 of the control signal becomes the voltage value at the connection point between the resistor elements R2 and R3. The voltage value at the connection point between the resistor elements R2 and R3 is set to a value higher than the voltage value V2 at the gate terminal of the switch control element Q2 and sufficiently higher than the operating threshold voltage of the enable terminal EN of the DC/DC converter 28.

When the voltage value V0 of the power supplied from the AC adapter 8 exceeds the overvoltage threshold value, or when the value of the current flowing through the power supply line 25 exceeds the overcurrent threshold value even if V0 is not more than the overvoltage threshold value, the voltage value V6 at the connection point 33 increases. With this, the transistor Q4 in the control signal output unit 36 is turned on, and the voltage value at the collector terminal of the transistor Q4 is decreased to a value almost close to the ground potential. Specifically, the voltage value V3 of the control signal becomes a value almost close to the ground potential, which decreases the voltage value at the connection point between the resistor elements R2 and R3 to almost the ground potential. With this, the switch control element Q2 is forcibly turned off, and the switching element Q1 is also forcibly turned off. This brings the power supply line 25 into the shut-off mode, so that power from the AC adapter 8 is not supplied to the input voltage terminal VIN of the DC/DC converter 28. In addition, the control signal having the voltage value V3 close to the ground potential is transmitted to the enable terminal EN of the DC/DC converter 28 to stop the operation of the DC/DC converter 28. Thus, power is not outputted from the output voltage terminal VOUT of the DC/DC converter 28, whereby the load circuit 12 is safely protected from overvoltage.

As described above, the resistor elements R7 and R8 in the control signal output unit 36 serve as an abnormal detection resistor element for detecting whether an abnormal state in which the voltage value V0 of the power supplied from the AC adapter 8 exceeds the overvoltage threshold value is generated or not, or for detecting whether an abnormal state in which the value of the current flowing through the power supply line 25 exceeds the overcurrent threshold value is generated or not. The transistor Q4 is an abnormal detection transistor which is turned on/off with the terminal voltage of the abnormal detection resistor element, the transistor Q4 enabling the DC/DC converter 28 to operate when turned off, and outputting a control signal for stopping the operation of the DC/DC converter 28 when turned on. The control signal output unit 36 outputs the same control signal common to two cases, which are the overvoltage detection and the overcurrent detection, with the minimum necessary constituent elements which are two resistor elements R7 and R8 and one transistor Q4. Notably, the resistance values of the resistor elements R7 and R8 are set to a high-resistance value that is sufficient for abnormality detection but insufficient to allow power with overvoltage or power with overcurrent to flow through the ground potential.

According to the operations of the overvoltage detection element 32, the overcurrent detection element 34, and the control signal output unit 36, the DC/DC converter 28 is protected when the power supplied from the AC adapter 8 is in an overvoltage state or in an overcurrent state more than the specification of the DC/DC converter 28.

The low-voltage protection unit 38 stops the operation of the DC/DC converter 28 to prevent low-voltage power from being outputted to the load circuit 12, when power supplied from the AC adapter 8 has a lower voltage than the voltage range specified by the specification of the audio device 10. In this way, the low-voltage protection unit 38 safely protects the load circuit 12 from causing malfunction by a low voltage. The low-voltage protection unit 38 is provided because, when the power supplied from the AC adapter 8 has a lower voltage than the voltage range in the specification of the audio device 10, the overvoltage detection element 32 and the overcurrent detection element 34 are useless, and this power is inputted to the input voltage terminal VIN of the DC/DC converter 28.

When the transistor Q4 in the control signal output unit 36 is in an off state, the low-voltage protection unit 38 generates an enable signal having a voltage value VEN in which the voltage level of the voltage value V3 of the control signal is reduced with a predetermined voltage dividing ratio by using the resistor elements R11 and R12 provided between the collector terminal, which is the output terminal of the transistor Q4, and the ground potential as a voltage level conversion element.

The resistor elements R11 and R12 are set such that, when the voltage value of power supplied from the AC adapter 8 is within the voltage range in the specification of the audio device 10, the voltage value of the control signal is set to a value sufficiently higher than the threshold voltage of the enable terminal EN of the DC/DC converter 28 and the voltage value VEN of the enable signal is also set to be higher than the threshold voltage of the enable terminal EN. Another condition is provided to R11 and R12. Specifically, R11 and R12 are set such that, when the voltage value of power supplied from the AC adapter 8 is a lower limit value of the voltage range in the specification of the audio device 10, the voltage value VEN of the enable signal becomes the threshold voltage of the enable terminal EN.

For example, the voltage range in the specification of the audio device 10 is set as from 27 V to 18 V, and the threshold voltage of the enable terminal EN of the DC/DC converter 28 is set as 4 V. If the voltage value of power supplied from the AC adapter 8 is within 27 V to 18 V, the voltage value V3 of the control signal is set to be from 6 V to 4 V, and the voltage value VEN of the enable signal is set to be from 5 V to 4 V. In this case, the DC/DC converter 28 is in an enabling state, so that it can be operated. When the voltage value of power supplied from the AC adapter 8 becomes a low voltage less than 18 V, which is outside the voltage range in the specification, the voltage value VEN of the enable signal becomes less than 4 V, so that the DC/DC converter 28 stops its operation.

As described above, the low-voltage protection unit 38 safely protects the load circuit 12 from causing malfunction by a low voltage outside the specification range by appropriately setting the resistor elements R11 and R12.

The rated voltage protection unit 40 is provided to prevent a voltage equal to or higher than the rated voltage from being supplied to the input voltage terminal VIN of the DC/DC converter 28. The rated voltage protection unit 40 is provided for the reason described below. Specifically, when the control signal output unit 36 detects an abnormal state such as overvoltage or overcurrent, the operation of the DC/DC converter 28 is stopped, but even in this case, a current flows through the current limiting resistor element R1 to be supplied to the input voltage terminal VIN of the DC/DC converter 28 through the power supply line 25. As described for the control signal output unit 36, R7 and R8 have high resistance insufficient to allow power with overvoltage or power with overcurrent to flow through the ground potential. Therefore, the overvoltage state or the overcurrent state cannot be eliminated, resulting in that excessive power is likely to be supplied to the input voltage terminal VIN of the DC/DC converter 28.

The rated voltage protection unit 40 includes a zener diode Z2 and a capacitor C4. One terminal of the zener diode Z2 is connected to the power supply line 25 at the side of the input voltage terminal VIN of the DC/DC converter 28, and the other terminal is connected to the ground potential. A threshold voltage Z2 by which the zener diode Z2 is turned on is set such that the value of power flowing through the power supply line 25 does not exceed the rated power value, together with the resistance value R1 of the current limiting resistor element R1. For example, when the rated power value is defined as 25 V×200 mA=5 W, (Z2/0.3 kΩ)×Z2=5 W is established with the resistance value R1 of the current limiting resistor element R1 being 0.3 kΩ. Therefore, (Z2)2=1500 V2, and Z2=38.7 V. With this, the zener diode Z2 with the threshold voltage Z2 of 38 V is provided. As described above, the rated voltage protection unit 40 has a function of preventing power equal to or higher than the rated power from being supplied to the power supply line 25 at the side of the DC/DC converter 28 together with the current limiting resistor element R1.

The DC/DC converter 28 is a DC voltage converter that converts the voltage value of DC power supplied from the power supply line 25 to the input voltage terminal VIN into DC power having the voltage value VOUT suitable for the load circuit 12, and outputs the resultant voltage from the output voltage terminal VOUT. The DC/DC converter 28 has the enable terminal EN. The DC/DC converter 28 can operate when the voltage value VEN of the enable signal inputted to the enable terminal EN is equal to or higher than the threshold voltage. When the voltage value VEN is less than the threshold voltage, the DC/DC converter 28 stops its operation, and does not output power to the output voltage terminal VOUT even if power is supplied to the input voltage terminal VIN.

According to the above configuration, the protection circuit operates with power supplied from the AC adapter 8, has a soft start function, and performs overvoltage protection, overcurrent protection, low-voltage protection, or rated power protection, to the load circuit 12.

What is claimed is:

1. A protection circuit which protects a load circuit operating with power supplied from an AC adapter, the protection circuit comprising:
   a power supply line extending from an input terminal connected to the AC adapter to an output terminal connected to the load circuit via a DC/DC converter;
   a switch unit provided between the input terminal and the DC/DC converter; and
   a protection circuit unit that stops the operation of the DC/DC converter to protect the load circuit, when an overvoltage or an overcurrent is detected, wherein
   the protection circuit unit includes:
   an overvoltage detection element that is turned on when a supplied voltage to the input terminal exceeds a predetermined overvoltage threshold value;
   an overcurrent detection element that is turned on when a current flowing through the power supply line exceeds a predetermined overcurrent threshold value; and
   a control signal output unit having an abnormal detection resistor element connected in series between a ground potential and a connection point where the overvoltage detection element and the overcurrent detection element are connected to each other in parallel, and an abnormal detection transistor that is turned on/off at a terminal voltage of the abnormal detection resistor element, the control signal output unit outputting a control signal for enabling the DC/DC converter to operate when the abnormal detection transistor is off and for stopping the operation of the DC/DC converter when the abnormal detection transistor is on, wherein
   the switch unit includes:
   a switching element connected in series between the input terminal and the DC/DC converter;
   a current limiting resistor element which is connected in parallel to the switching element and has a resistance value larger than on-resistance of the switching element; and
   a switch control element that turns on the switching element when a current flows through the current limiting resistor element, wherein
   a timing at which the switching element is turned on is delayed from a point at which a supply of power is started from the AC adapter, according to a delay time of currents flowing through the current limiting resistor element and the switch control element, and
wherein
   the protection circuit unit includes a low-voltage protection unit that generates an enable signal in which a voltage level of the control signal is reduced with a predetermined voltage dividing ratio by a level conversion element provided between an output terminal of the abnormal detection transistor and the ground potential, the low-voltage protection unit controlling to set a voltage level of the enable signal to a voltage less than an operating threshold voltage of the DC/DC converter when the supplied voltage from the input terminal is less than a predetermined low voltage threshold value, in order to stop the operation of the DC/DC converter even if the abnormal detection transistor is off.

2. The protection circuit according to claim 1, wherein the protection circuit unit includes a rated voltage protection unit that is provided between an output-side terminal of the current limiting resistor element and the ground potential and that is turned on when a voltage at the output-side terminal of the current limiting resistor element exceeds a maximum rated voltage set beforehand to prevent a supply of a voltage exceeding the maximum rated voltage to the DC/DC converter.

* * * * *